Figure 1:
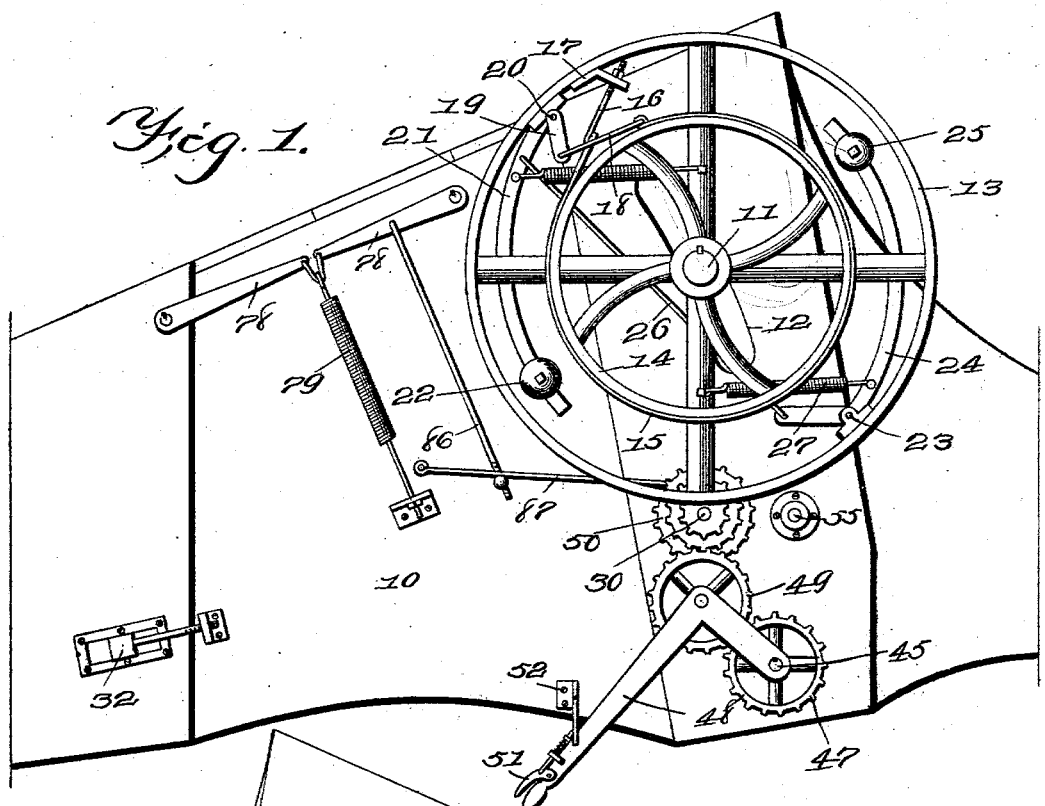

No. 715,443. Patented Dec. 9, 1902.
A. VANHOUWELING.
BAND CUTTER AND FEEDER FOR THRESHING MACHINES.
(Application filed July 6, 1900.)

(No Model.) 3 Sheets—Sheet 1.

Witnesses:
R. G. Orwig
F. C. Stuart

Inventor
Arthur Van Houweling
by J. Ralph Orwig, Atty.

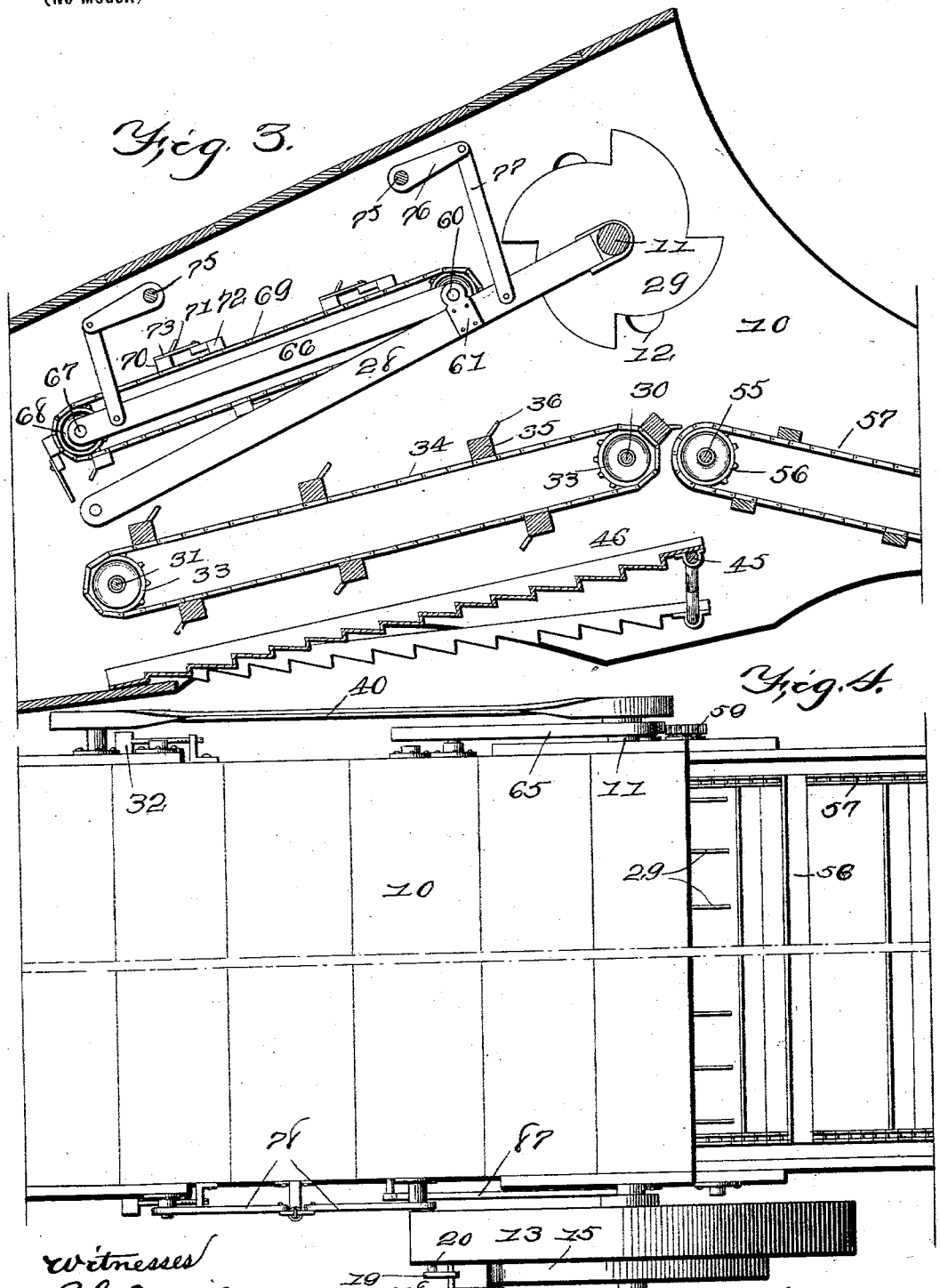

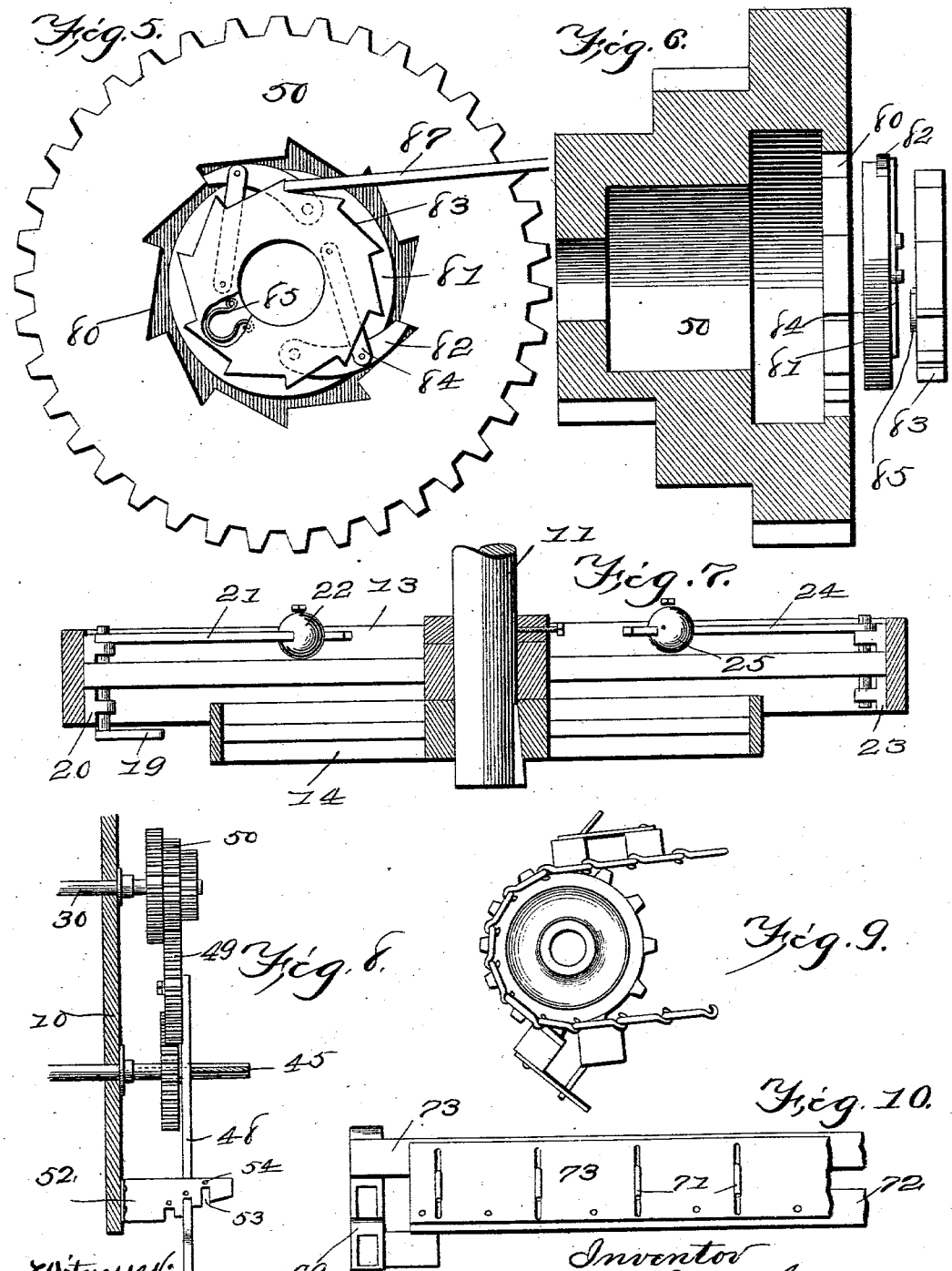

UNITED STATES PATENT OFFICE.

ARTHUR VANHOUWELING, OF PELLA, IOWA.

BAND-CUTTER AND FEEDER FOR THRESHING-MACHINES.

SPECIFICATION forming part of Letters Patent No. 715,443, dated December 9, 1902.

Application filed July 6, 1900. Serial No. 22,688. (No model.)

*To all whom it may concern:*

Be it known that I, ARTHUR VANHOUWELING, a citizen of the United States, residing at Pella, in the county of Marion and State of Iowa, have invented certain new and useful Improvements in Band-Cutters and Self-Feeders for Threshing-Machines, of which the following is a specification.

The objects of my invention are, first, to provide an improved and simplified governing device whereby the conveyer of the band-cutter and feeder will not be operated until the speed of the threshing-machine to which the band-cutter and feeder are geared has reached a certain predetermined speed and whereby the motion of the band-cutter and feeder will be stopped whenever the threshing-machine falls below this speed.

A further object is to provide improved means for automatically stopping the conveyer leading to the threshing-cylinder whenever the amount of grain upon the conveyer reaches a certain predetermined depth, so that the upper conveyer may carry off the top portions of the bundles upon the conveyer until the proper thickness of the layer of grain upon the conveyer has been reached, whereupon the grain will be again advanced to the cylinder, and, further, in this connection it is my object to provide a device of this class in which the band-cutting knives are mounted on a rotatable shaft and the sprocket-wheels of the upper conveyer are mounted on another shaft, so that the cross-pieces may be used on the upper conveyer. Obviously this would not be possible, as the sprocket-wheels and the band-cutting knives are all mounted on the same shaft.

A further object is to provide improved means for easily and quickly adjusting the machine so that different quantities of grain may be fed to the cylinder to thereby adapt a band-cutter and feeder of a certain size for use in connection with threshing-machines of different capacities.

A further object is to provide improved means for automatically removing grain from the teeth on the upper conveyer.

A further object is to provide an independent conveyer for carrying the grain to the cylinder, which conveyer may be made of suitable weight and material for its purposes and which drives another conveyer for carrying the grain to the point where the bands are being severed. It is to be remembered in this connection that the conveyer for carrying the grain to the point where the bands are severed need only be made of light material, without teeth in the cross-pieces thereof, while the conveyer leading from the band-cutter to the cylinder must be considerably heavier and must be provided with teeth. Hence by separating these conveyers a cheaper, stronger, and more durable device is attained.

My invention consists in certain details in the construction, arrangement, and combination of the various parts of the machine, as hereinafter more fully set forth, pointed out in my claims, and illustrated in the accompanying drawings, in which—

Figure 2:
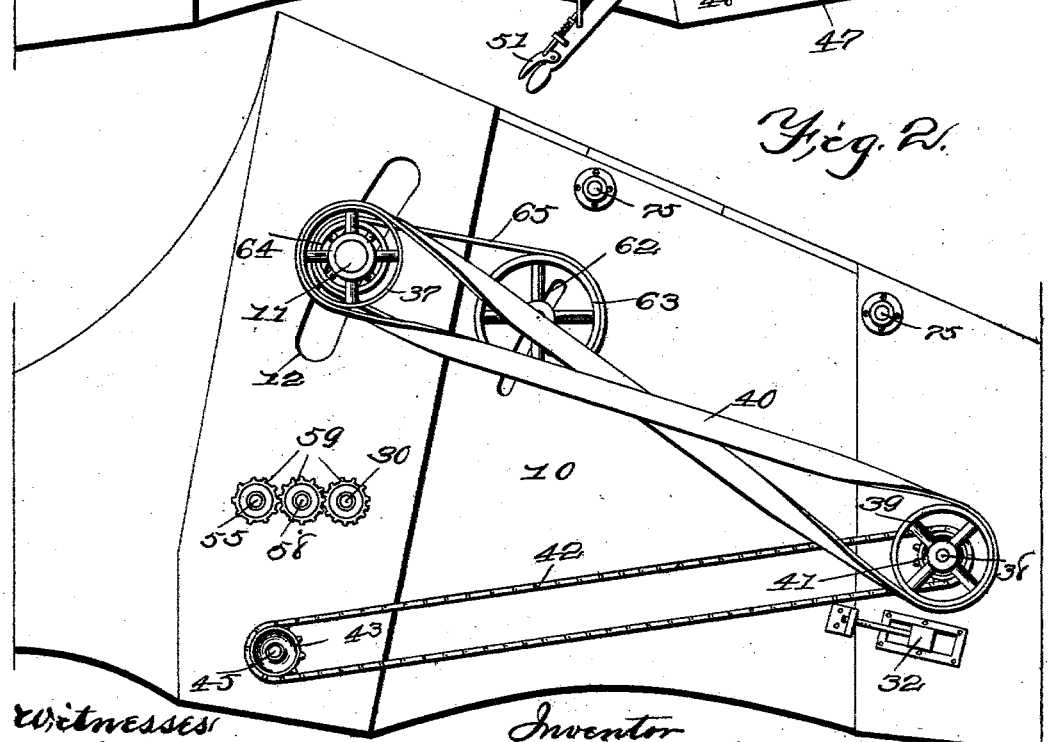

Figure 1 shows a side elevation of the band-cutter and feeder. Fig. 2 shows a similar view of the opposite side. Fig. 3 shows a side elevation of the band-cutter and feeder with one side removed to show the interior mechanism and also showing the lower conveyer and feeding-pan in section. Fig. 4 shows a top or plan view of the complete band-cutter and feeder. Fig. 5 shows an enlarged detail face view of the gear-wheel on the shaft of the lower conveyer and also the means connected therewith for throwing said gear-wheel in or out of connection with its shaft. Fig. 6 shows a central sectional view of the parts illustrated in Fig. 5 with the disk and the ratchet-wheel separated, so as to show their construction. Fig. 7 shows a horizontal sectional view of the driving-pulley of the band-cutter and feeder for the purpose of illustrating the approximate position of the weights of the governing device. Fig. 8 shows a detail sectional view illustrative of the means for adjusting the speed of the band-cutter and feeder for use in connection with threshing-machines of different capacities. Fig. 9 shows an enlarged detail illustrating the means for cleaning the teeth of the upper conveyer, and Fig. 10 shows a top or plan detail of the same parts.

Referring to the accompanying drawings, I have used the reference-numeral 10 to indicate the frame of the band-cutter and feeder. The driving-shaft of the band-cutter and feeder is indicated by the numeral 11 and is passed through the slots 12 in the sides of the frame for purposes hereinafter made clear. Loosely mounted upon one end of this shaft is a pulley 13. In use a belt connects this pulley 13 with a pulley on the cylinder-shaft of the threshing-machine. Keyed to the same shaft and adjacent to the pulley 13 is a band-wheel 14. A metal band-brake (indicated by the numeral 15) is passed around the band-wheel 14 and has its one end connected with the inner surface of the pulley 13 by means of the bolt 16 and bracket 17. The other end of the band 15 is connected, by means of a link 18, with a crank arm 19, said arm being fixed to a shaft 20, having its bearings upon the inner surface of the pulley 13. A curved arm 21 is fixed to the other end of the shaft 20 within the pulley, and a weight 22 is adjustably fixed to its end. A shaft 23, similar to the shaft 20, is rotatably mounted on the inner surface of the pulley 13 at a point diametrically opposite to the shaft 20, and a lever 24 is fixed to the said shaft, provided with a weight 25, and one end of said lever is connected, by means of a rod 26, with the lever 21. Both of these levers are normally held inwardly, so that the weights 22 and 25 are held as near to the center as may be possible by means of contractile coil-springs 27, attached to the arms 21 and 24 and to the spokes of the pulley 13. In use it is obvious that when the speed of rotation of the pulley 13 increases the weights 22 will be thrown outwardly by centrifugal force, thus operating to tighten the band-brake 15 upon the band-wheel 14, and when a certain speed is reached the band-wheel 14 will be rotated in unison with the pulley 13. Hence the feeding of grain to the threshing-cylinder will not be commenced until the threshing-machine attains its proper speed and will be discontinued as soon as the speed of the threshing-machine falls below the proper point. It is obvious, further, that the governor may be adjusted or regulated to operate when any desirable speed has been attained, either by an adjustment of the bolt 16 with relation to the bracket 17 or by an adjustment of the weights 22 and 25 upon the curved levers. Within the interior of the frame the shaft 11 is supported by means of two arms 28, which arms are fulcrumed on the inner surfaces of the frame at points near the end of the machine nearest the threshing-machine. Hence the shaft 11 may move upwardly and downwardly in an arc from the pivotal point of the arms 28. On the shaft 11 I have fixed a series of band-cutting knives 29 of ordinary construction.

Directly beneath the shaft 11 I have mounted for rotation a shaft 30, and at a point near the threshing-machine I have mounted a shaft 31 in the adjustable bearings 32 in the sides of the machine-frame. On these shafts 30 and 31 I have mounted the sprocket-wheels 33, and an endless-chain conveyer 34 is provided to travel over the sprockets. On this conveyer-chain 34 are the cross-pieces 35, having the rearwardly-inclined pieces 36. I have provided means for driving this conveyer, as follows: On the end of the shaft 11, on the side opposite from the pulley 13, I have mounted a pulley 37, and at a point a slight distance above the shaft 31 I have mounted on the exterior of the machine-frame a stub-shaft 38, having thereon a pulley 39, connected by the belt 40 with the pulley 37, so that this stub-shaft is constantly driven during the rotation of the shaft 11. I have also mounted on the stub-shaft 38 a sprocket-wheel 41, which sprocket-wheel is connected, by means of a chain 42, with a sprocket-wheel 43 on a crank-shaft 45. On this crank-shaft 45 the shaking-pans 46 are mounted, so as to be operated for the purpose of advancing the grain to the threshing-cylinder at all times during the rotation of the shaft 11. On the opposite end of the crank-shaft 45 is a cog-wheel 47, which cog-wheel is feathered to the shaft 45 to be capable of sliding but not rotating thereon. A right-angled lever 48 is fulcrumed at one end to the shaft 45 and has a cog-wheel 49 mounted thereon in mesh with the cog-wheel 47. On the end of the shaft 30, adjacent to the cog-wheel 47, I have provided a device 50, having cog-wheels thereon of graduated sizes, and the wheel 49 is designed to be meshed with any one of the cogged surfaces of the device 50. This is accomplished by means of a spring-actuated pawl 51 on the lever 48 and a bracket on the side of the machine-frame having a series of notches 53 therein and openings 54 above the notches. These openings 54 are designed to receive the spring-actuated pawl 51 and the notches 53 to receive the lever 48. It is obvious that the lever 48 may be drawn downwardly and then moved laterally, so as to slide the wheel 47 upon its shaft until the cog-wheel 49 is adjacent to any one of the cogged surfaces of the device 50. Then the lever 48 is raised until the cog-wheel 49 meshes with the cogged surfaces of the device 50, thus providing for rotating the shaft 30 at different speeds with relation to the shaft 45.

Motion is imparted from the shaft 30 to the conveyer which leads up to the band-cutting knives, as follows: The reference-numeral 55 indicates a shaft rotatably mounted adjacent to the shaft 30. On the shaft 55 are sprocket-wheels 56, over which the endless conveyer 57 is passed. A stub-shaft 58 is fixed to the machine-frame between the shafts 30 and 55, and a train of gears 59 connects these three shafts, whereby they are rotated in unison and the conveyers made to run in the same direction.

Above the conveyer 34 I have mounted an auxiliary conveyer, as follows: The reference-numeral 60 indicates a conveyer-shaft rotatably mounted in bearings 61 on the arms 28. One end of the shaft 60 projects through a slot 62 in the side of the frame, and a pulley 63 is fixed thereto and connected with a pulley 64 on the shaft 11 by the belt 65. Two parallel arms 66 project rearwardly from the shaft 60 and support another shaft 67 at their rear ends. The shafts 60 and 67 are provided with sprocket-wheels 68, over which the endless conveyer 69 passes. On this endless conveyer 69 are a series of cross-pieces 70, having the inclined teeth 71 fixed thereto. Immediately in front of each of the cross-pieces 60 I have provided a cross-piece 72, having thereon a slotted plate 73. This slotted plate is so arranged with relation to the conveyer that when the conveyer is traveling in a straight line the teeth 71 project through the slots in the plate to engage the grain beneath the conveyer. However, when at the rearward turn of its movement the said slotted plates 73 will be moved downwardly and rearwardly from the cross-piece 7 to thereby strip the grain from the teeth 71, thus preventing the grain from becoming entangled with the teeth of the conveyer. I have provided means whereby this upper conveyer may be raised and lowered by means of the grain passing beneath it, as follows: Two shafts 75 are mounted in the machine-frame above the upper conveyer, and on the interior of the frame the crank-arms 76 are fixed to these shafts to project in opposite directions, and the links 77 connect the ends of these cranks 76 with the arms 28 and the side pieces 66. On the exterior of the machine, as clearly seen in Fig. 1, two arms 78 are keyed to the shafts 75 and extend in a direction toward each other, and a contractile coil-spring 79 is attached to the arms to normally hold them downwardly, thus tending to normally support the weight of the upper conveyer, thereby holding it in its proper position with relation to the lower conveyer and at the same time permitting it to move vertically. I have provided means whereby upon the raising and lowering of this upper conveyer and the band-cutting knives the speed of the lower conveyer is automatically regulated, as follows: On the interior of the part 50 I have formed a series of ratchet-teeth 80. Keyed to the shaft 30 is a disk 81, having on its upper surface two pawls 82, designed when thrown outwardly to engage with the ratchet-teeth 80 and when drawn inwardly to permit the disk 81 to rotate freely within the device 50 without turning it. On the outer surface of the disk 81 is a ratchet-wheel 83, having on its inner surface two pivoted pawls 82. I have provided a spring 85, one end of which is fixed to a pin on the disk 81 and the other to a pin on the inner surface of the ratchet-wheel 83, the tendency of which spring is to hold the ratchet and disk in such relative position that the pawls 82 will be normally held outwardly in engagement with the ratchet-teeth 80. It is now obvious that if the ratchet-wheel 83 is stopped in its rotation the spring 85 will be compressed and the pawls 82 be drawn inwardly, so as to be out of engagement with the ratchet-teeth 80. I have provided means whereby the rotation of this ratchet-wheel 83 is automatically stopped when the band-cutting knives or the upper conveyer are elevated by means of a thick bundle of grain on the conveyer leading to the cylinder, as follows: On one of the arms 78 I have attached a rod 86. A lever 87 is pivoted to the frame 10, and the said rod 82 is adjustably connected therewith. The other end of this lever 87 is extended to a position where when it lowers by gravity it will engage the ratchet-wheel 83. Hence as soon as the band-cutting knives or upper conveyer are elevated the movement of the lower conveyer will be stopped, while the upper conveyer and the shaking-pans 46 will continue to operate, thus reducing the thickness of the bundle by taking off its top until the upper conveyer and band-cutting knives have dropped to their normal position, whereupon the lever 87 will rise and the operation of the lower conveyer will be again started.

In practical use it is obvious that by fixing the band-cutting knives to one shaft and by fixing the upper conveyer-sprockets to a separate shaft they may conveniently and independently be used, and cross-pieces may be used on the upper conveyer without interfering in any way with the operation of the knives.

Having thus described my invention, what I claim, and desire to secure by Letters Patent of the United States, is—

1. In a band-cutter and feeder, the combination of two arms pivoted to the machine-frame, a shaft supported in the free ends thereof, band-cutting knives fixed to said shaft, a shaft mounted in bearings on said arms, sprocket-wheels fixed to said shaft, two parallel side pieces connected with the shaft of the sprocket-wheels, a second shaft connected with the other ends of the parallel side pieces, sprocket-wheels on said latter shaft, sprocket-chains passed around said sprocket-wheels, cross-pieces connecting the sprocket-chains and capable of passing over the sprocket-wheels, means for yieldingly supporting the said arms and the said parallel side pieces, a conveyer beneath said sprocket-chains, means for driving said conveyer from the knife-bearing shaft, and means for controlling the motion of the lower conveyer by the up and down movements of the said parallel side pieces.

2. In a band-cutter and feeder, the combination of two arms pivoted at one end to the conveyer-frame, a knife-bearing shaft mounted in their free ends, a pulley on said shaft, a belt by which said pulley may be driven, a conveyer-frame pivoted at one end upon said arms, an endless conveyer mounted upon said frame, a pulley on one of said conveyer-shafts, a second pulley on the knife-bearing shaft, a belt connecting the said pulleys, a shaft 38 mounted for rotation in the machine-frame adjacent to the pivotal points of the said arms, a belt-wheel and a sprocket-wheel on said shaft, a belt-wheel on the knife-bearing shaft and a belt connecting these two wheels, an endless conveyer for carrying grain to the discharge end of the machine and means for driving same from said sprocket-wheel, for the purposes stated.

3. In a band-cutter and feeder, the combination of a shaft for driving an endless conveyer leading to a threshing-machine cylinder, a cog-wheel loosely mounted on said shaft, and having an internal ratchet-toothed surface 80, a disk 81 within the said cog-wheel, having thereon the pivoted pawls 82 and a ratchet-wheel 83 mounted adjacent to the disk 81, links 84 pivoted to the ratchet-wheel, and to said pawls 82, a spring 85 attached to both the disk 81 and the ratchet-wheel 83, and a lever 87 designed to engage the ratchet-wheel 83, said lever being fulcrumed to the machine-frame, and means for automatically elevating the lever out of engagement with the ratchet-wheel 83 when an excessive quantity of grain is on the conveyer and thereby stop the conveyer.

4. In a self-feeder for threshing-machines, the combination of an endless-chain conveyer cross-pieces fixed to the conveyer, teeth projecting from the said cross-pieces, a cross-piece mounted upon the conveyer-chains in advance of each of said toothed cross-pieces, and a slotted plate on each of said latter cross-pieces, designed when the chain is traveling straight to permit the said teeth to project through the slots thereof, and when the chains are rounding the sprockets, to move outwardly from the teeth, to thereby remove the straw, &c., from the teeth.

5. In a band-cutter and feeder, the combination of two arms pivotally supported at one end, a shaft mounted in the free ends thereof, band-cutting knives on said shaft, an endless conveyer having cross-pieces thereon connected with said arms said conveyer extending from a point near the knives toward the delivery end of the machine, a second conveyer beneath the first and means for controlling the movements of the lower conveyer by the up and down movements of the upper one, for the purposes stated.

ARTHUR VANHOUWELING.

Witnesses:
J. H. STUBENRAUCH,
S. H. VIEMN.